United States Patent
Janardhan et al.

(10) Patent No.: US 10,270,248 B2
(45) Date of Patent: Apr. 23, 2019

(54) SYSTEM AND METHOD TO IMPROVE ENGINE RESPONSE DURING HYBRID POWER GENERATION

(71) Applicant: Caterpillar Inc., Peoria, IL (US)

(72) Inventors: Vijay Janardhan, Dunlap, IL (US); Perry Converse, Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 1216 days.

(21) Appl. No.: 14/502,288

(22) Filed: Sep. 30, 2014

(65) Prior Publication Data

US 2016/0094085 A1 Mar. 31, 2016

(51) Int. Cl.
| | | |
|---|---|---|
| *H02J 1/10* | (2006.01) | |
| *H02J 3/06* | (2006.01) | |
| *H02J 3/46* | (2006.01) | |
| *H02J 1/14* | (2006.01) | |
| *H02J 3/32* | (2006.01) | |

(52) U.S. Cl.
CPC . *H02J 1/14* (2013.01); *H02J 3/32* (2013.01)

(58) Field of Classification Search
CPC .................................. H02J 1/14; H02J 3/32
USPC ........................................................ 307/20
See application file for complete search history.

(56) References Cited

U.S. PATENT DOCUMENTS

| | | | | |
|---|---|---|---|---|
| 2008/0143119 A1* | 6/2008 | Asada | ................... | F02D 41/083 290/40 B |
| 2011/0215641 A1* | 9/2011 | Peterson | ................ | H01H 11/00 307/23 |
| 2014/0103727 A1* | 4/2014 | Taimela | .................... | H02J 3/24 307/76 |
| 2014/0159365 A1* | 6/2014 | Algrain | ..................... | H02J 3/32 290/7 |
| 2014/0339893 A1* | 11/2014 | Votoupal | ................. | H02J 9/066 307/24 |

* cited by examiner

*Primary Examiner* — Richard Tan
(74) *Attorney, Agent, or Firm* — Finnegan, Henderson, Farabow, Garrett & Dunner, LLP (57) ABSTRACT

A hybrid energy system including a controller that is coupled to at least one generator set and to at least one energy storage device. The controller is configured to cause the at least one generator set to operate at a first operational speed and a second operational speed in response to a change in the load. The controller receives notice that the at least one energy storage device is providing energy to the load and, in response thereto, to changes the amount of energy that the at least one generator set is providing to the load by causing the at least one generator set to operate at a third operational speed.

18 Claims, 4 Drawing Sheets

SYSTEM AND METHOD TO IMPROVE ENGINE RESPONSE DURING HYBRID POWER GENERATION

TECHNICAL FIELD

This patent disclosure relates generally to hybrid energy systems and, more particularly, to a method and apparatus for controlling hybrid energy systems.

BACKGROUND

Hybrid energy systems often include a primary energy source (e.g., one or more generator sets) that is coupled to a load. During certain operating conditions (e.g., high-speed low torque), the primary energy source meets all of the energy requirements of the load, but during other operating conditions, the primary energy source may be insufficient to satisfy increased load demands with a requisite transient response. For example, an operator or a load may require more energy than the primary energy source is capable of outputting at a given time. Accordingly, hybrid energy systems may include an energy storage device to provide additional energy to the load when engine output is insufficient to meet a desired transient response or may include an energy consumption device (load bank) to manage the average load to meet a desired transient response. There is a conflict, however, between providing an energy storage device that has a sufficiently high capacity to meet contemplated transient response needs and minimizing manufacturing costs. That is, the larger the capacity of the energy storage device, the higher the manufacturing cost.

U.S. Pat. No. 8,190,299 ("the '299 patent") issued to Rovnyak et al. discloses an energy control system and method to improve engine transient response. Rovnyak et al. employ feedback and control to respond to a sudden increase in load demand and corresponding drop in engine speed. Rovnyak et al. respond to such an increase by increasing the engine throttle angle. The increased throttle angle will cause engine speed to return to a desired set point faster than it would otherwise.

Although the methods of the '299 patent may improve the transient response of an engine, the '299 patent does not address how to improve the transient response of a hybrid energy system. Further, in a hybrid energy system, the energy storage device may be used to supplement the primary energy source to produce a desired response. The method employed by Rovnyak et al. does not address how to minimize the output of an energy storage device in a hybrid energy system while maintain adherence to transient response requirements.

The present disclosure is directed to overcoming one or more of the shortcomings set forth above.

SUMMARY

In one aspect, the disclosure is directed at an energy system. The system includes at least one generator set and at least one energy storage device. A controller is coupled to the at least one generator set and the at least one energy storage device. The controller is configured to cause the at least one generator set to operate at a first operational speed. The controller causes the at least one generator set to operate at a second operational speed in response to a change in the load. The controller is configured to receive a first indication comprising a notification that the at least one energy storage device is providing energy to the load and, in response to the indication, to change the amount of energy that the at least one generator set is providing to the load by causing the at least one generator set to operate at a third operational speed.

In one aspect, the disclosure is directed at a method of operating an energy system that includes at least one generator set and energy storage device that are configured to provide energy to a load. The at least one generator set is caused to operate at a first operational speed. The at least one generator set is caused to operate at a second operational speed in response to a change in the load. A first indication is received. The indication comprises a notification that the energy storage device is engaged in energy transfer with the load. The at least one generator set is caused to operate at a third operational speed in response to the first indication. A second indication is received. The second indication is notice that the energy storage device is not engaged in energy transfer with the load. The at least one generator set is caused to operate at the second operational speed in response to the second indication.

In one aspect, a method of controlling a hybrid energy system that is driving a load is provided. A hybrid energy system is caused to operate in a first operational mode in which at least one generator set operates at a first operational speed. An indication is received that an energy storage device is engaged in energy transfer with the load due to a change in the load. It is determined as to whether or not to enter into a second operational mode in response to receipt of the indication. The hybrid energy system is caused to operate in a second operational mode, in response to a determination to enter the second operational mode, by changing the amount of energy that that at least one generator set is providing to the load by causing the at least one generator set to operate at a second operational speed.

DETAILED DESCRIPTION

Figure 1:
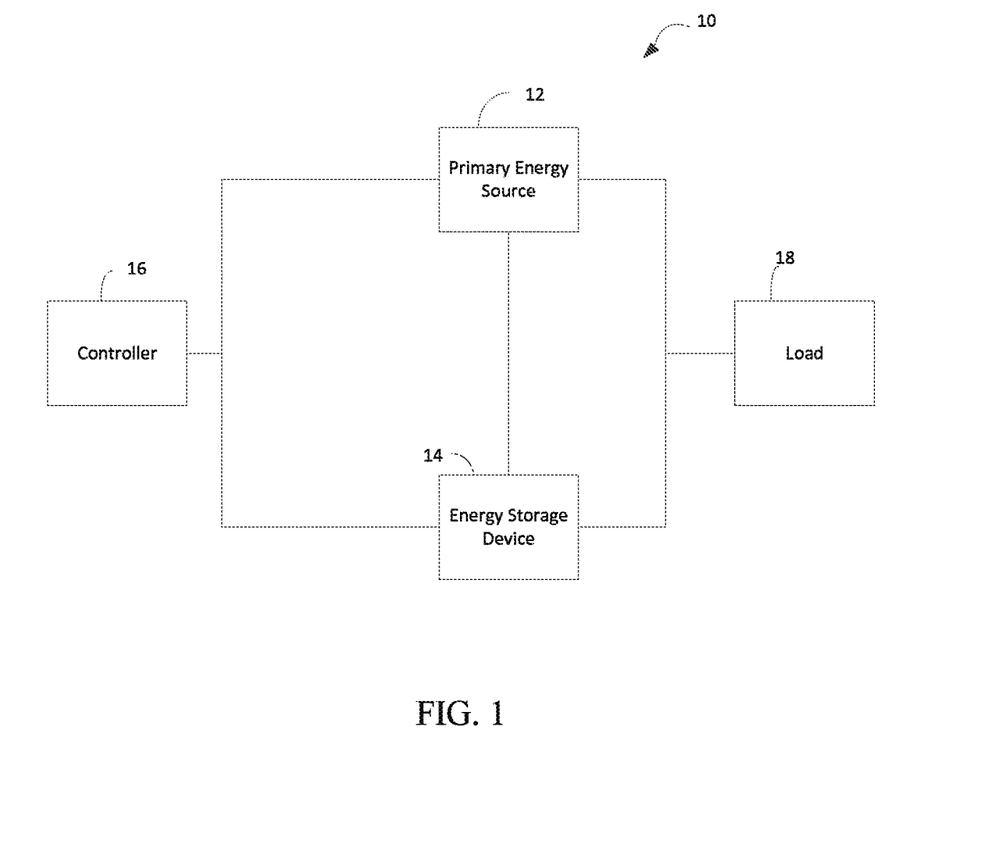
FIG. 1 is a diagrammatic illustration of an exemplary hybrid energy system in accordance with the present disclosure.

FIG. 1 illustrates an exemplary hybrid energy system 10. Specifically, the hybrid energy system 10 may include a primary energy source 12, an energy storage device 14, and a controller 16. The hybrid energy system 10 may be configured to selectively supply energy to and/or receive energy from a load 18. The primary energy source 12 may be operatively connected to the energy storage device 14 and the load 18 to selectively supply power thereto. The energy storage device 14 may be operatively connected to the primary energy source 12 to selectively receive and supply power with respect to the primary energy source 12 and may be operatively connected to the load 18 to selectively supply and receive power thereto. In one example, the hybrid energy system 10 may include an energy consumption device, such as a load bank, to manage the load 10 to meet a desired transient response.

The hybrid energy system 10 may be operatively associated with a machine, such as, for example, a locomotive, an on- or off-highway vehicle, a marine vehicle, an industrial power supply, and/or another work performing machine or power supply system. It is contemplated that the hybrid energy system 10 may include one or more additional and/or different components, such as, for example, a transmission device, gearing, electrical and/or hydraulic conduits, and/or other components known in the art. It is also contemplated that the components of the hybrid energy system 10, e.g., the primary energy source 12, the energy storage device 14, and the load 18, may be interconnected via any conventional method or apparatus.

Figure 2:
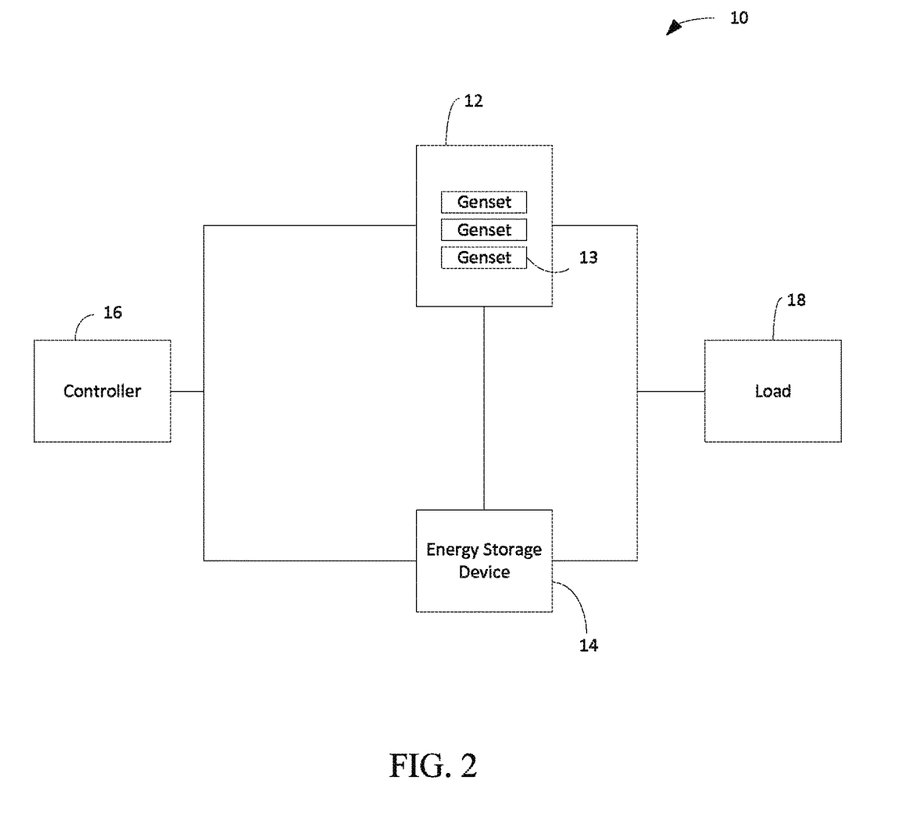
FIG. 2 is a diagrammatic illustration of the hybrid energy system of FIG. 1 in which the primary energy source is one or more generator sets.

The primary energy source 12 may include any source of power. For example, as shown in FIG. 2, the primary energy source 12 may include one or more generator sets 13, fuel cells, and/or any other energy-producing device. The one or more generator sets 13 may comprise diesel, gasoline, natural gas, or other types of generator sets. Referring back to FIG. 1, the primary energy source 12 may include a mechanical device, such as a crankshaft that is configured to drive the load 18. The primary energy source 12 may be operatively connected to the energy storage device 14 and the load 18 via an electrical and/or hydraulic circuit and may effectively operate as a source of energy. The primary energy source 12 may be controlled by the controller 16 to selectively vary the amount of energy output as a function of the controller 16 varying one or more operating parameters of the primary energy source 12. For example, the operating parameters can comprise an amount of fuel injected into a combustion chamber of a generator set 13, the timing of intake and exhaust valves, or any combination thereof.

The energy storage device 14 may include any source of energy, such as, for example, a hydraulic and/or electrical circuit. The energy storage device 14 may be configured to selectively receive and store energy. In one example, the energy storage device 14 may be one or more ultra-capacitors and/or batteries. In another example, the energy storage device 14 may include an electrical circuit including a variable speed generator set that receives energy from the primary energy source 12 to establish and deliver an electrical current to a battery. As such, the energy storage device 14 may convert energy received from the primary energy source 12 into electrical energy and may store the electrical energy within the battery. For instance, the energy storage device 14 may convert energy received from the primary energy source 12 into electrical current and/or voltage and store it within the battery. In another example, energy storage device 14 may include a hydraulic circuit including a fixed or variable displacement pump receiving energy from the primary energy source 12 to establish and deliver pressurized fluid to an accumulator. As such, the energy storage device 14 may convert energy received from the primary energy source 12 into hydraulic energy and may store the hydraulic energy within the accumulator. For instance, the energy storage device 14 may convert energy received from the primary energy source 12 into pressurized fluid that is stored within an accumulator. In another example, energy storage device 14 may include one or more capacitors configured to store electrical energy. It is contemplated that energy storage device 14 may include any quantity, type, and/or size of pumps, accumulators, motor-generator sets, batteries, and/or other components. Further, these various components may be used in various combinations that could be combined or divided. It is further contemplated that energy storage device 14 may be configured to selectively receive energy from the load 18, such as when the load 18 adds energy to the hybrid energy system 10.

The controller 16 may include one or more microprocessors, a memory, a data storage device, a communications hub, and/or other components known in the art. Specifically, the controller 16 may monitor one or more parameters of the hybrid energy system 10 and may affect the operation of the primary energy source 12 and/or the energy storage device 14. In an embodiment, the controller 16 may be integrated within a general machine control system capable of controlling additional various functions of the machine within which the hybrid energy system 10 may be associated. The controller 16 may be configured to receive input signals from one or more sensors, perform one or more algorithms to determine appropriate output signals, and may deliver the output signals to affect control of the primary energy source 12 and/or energy storage device 14. Referring to FIG. 2, for example, the controller 16 may control the amount of fuel delivered to a generator set 13, the timing of intake and exhaust valves associated with a generator set 13, the position of one or more valves associated with the energy storage device 14, the directional flow of pressurized fluid or electrical current associated with the energy storage device 14, additional functions and/or parameters associated with the primary energy source 12 and/or the energy storage device 14, and/or one or more combinations thereof. It is contemplated that the controller 16 may receive and deliver signals via one or more communication lines (not referenced).

The load 18 in one example comprises one or more systems, devices, and/or methods that consume energy from the hybrid energy system 10. The load 18 may include one or more driven components of a machine such as, for example, one or more traction devices configured to propel a vehicle relative to a surface or one or more reciprocating or rotating elements of a generator set 13. The load 18 may represent the aggregate energy demand of a plurality of devices for which the hybrid energy system 10 is an energy source. For instance, in mining or oil operations, the hybrid energy system 10 may provide energy to a plurality of machines, systems, and processes that are directed at performing supplementary or core functions related to the primary task (i.e. mining or oil production). The load 18 may be a variable load and may dynamically change during operation of the hybrid energy system 10 and may affect one or more operating parameters of the primary energy source 12 and/or the energy storage device 14 to correspondingly change. For example, the load 18 may vary as traction devices interact with different materials and/or different grades of a surface, the load 18 may vary as inertia of one or more driven components increases or decreases, and/or may vary as energy requirements change. It is contemplated that one or more operating parameters of the primary energy source 12 may also be changed by an operator and/or by the controller 16 as a function of the load 18.

Figure 3:
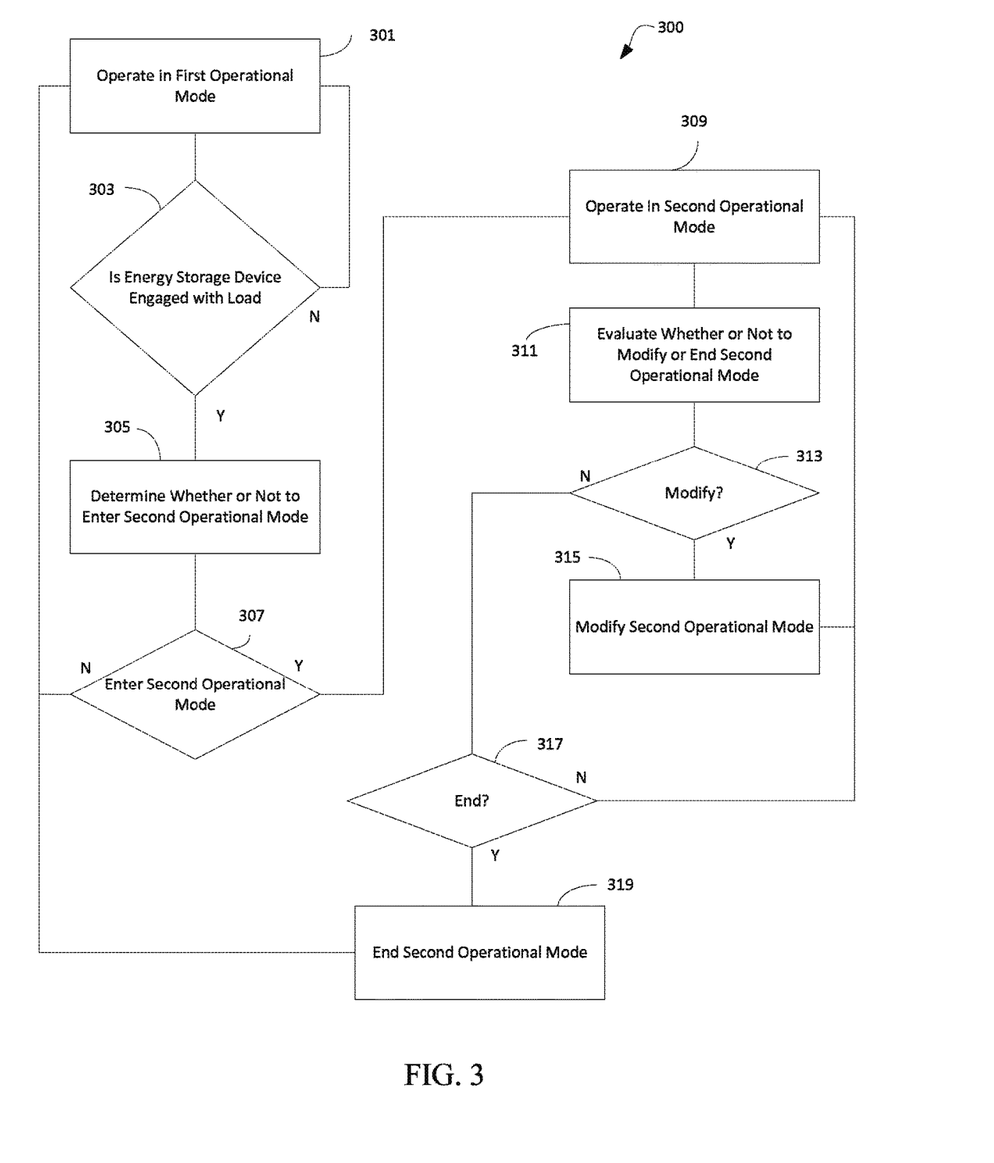
FIG. 3 is schematic illustration of an exemplary control algorithm executable by the controller of FIG. 1.

Referring to FIG. 3, a method 300 of operating the hybrid energy system 10 is now described for exemplary purposes. In step 301, the hybrid energy system 10 is operating in a first operational mode. In an embodiment, the first operational mode is a steady state operation in which the primary energy source 12 is providing energy to the load 18 and the energy storage device 14 is not providing (or is providing negligible) energy to the load 18. In an another example, the first operational mode may be an operational mode in which the primary energy source 12 is providing energy to the load 18 and the energy storage device 14 is providing energy to the load, but the amount of energy that the energy storage device 14 is providing to the load 18 is substantially constant over a period of time. In a further example, the first operational mode may be an operational mode in which the primary energy source 12 is providing energy to the load 18 and the energy storage device 14 is receiving energy from the load 18, but the amount of energy that the energy storage device 14 is receiving from the load 18 is substantially constant over a period of time.

In step 303, in one example, the controller 16 determines whether or not the energy storage device 14 is engaged in energy transfer with the load 18. For instance, due to a change in the load demand, the energy storage device 14 may provide energy to the load 18 in order to respond to change in load demand with a certain desired transient response. In another example, due to a change in load demand, the hybrid energy system 10 (and correspondingly the energy storage device 14) may receive energy from the load 18. For instance, it may be desirable to charge the energy storage device 14 with excess power from the load 18. In a further example, in step 303, the energy storage device 14 may already be engaged in energy transfer with the load 18, but due to a change in load demand, there may be change in the degree of energy transfer between the energy storage device 14 and the load 18. Accordingly, the controller 16 may determine that there has been a change in energy transfer between the energy storage device 14 and the load 18.

In one example, in step 303, the controller 16 may determine that the energy storage device 14 is engaged with the load 18 (or there has been a change in engagement with the load 18) upon receiving notice from the primary energy source 12, the energy storage device 14, the load 18, and/or external sensors. Such notice may comprise the receipt of signals from one or more of the primary energy source 12, the energy storage device 14, the load 18, and/or external sensors indicating that the energy storage device 14 is engaged with the load 18. In another example, the controller 16 may determine that the energy storage device 14 is engaged in power transfer with the load 18 through the execution of an algorithm that will serve as an indication comprising notice to the controller 16 of the power transfer between the controller 16 and the load 18 during certain operating conditions. For instance, hybrid energy system 10 may be configured such that the energy storage device 14 provides a predetermined amount of energy to the load 18 if the load demand is a predetermined amount.

In step 303, if the controller 16 determines that the energy storage device 14 is engaged with the load 18 (or there has been a change in engagement with the load 18), then the method passes to step 305. Otherwise, the method passes to step 301.

In step 305, the controller 16 makes a determination as to whether or not to enter a second operational mode in response to determining that the energy storage device 14 is engaged in energy transfer with the load 18 (or there has been a change in engagement with the load 18). In one example, the second operational mode may be an operating state in which the controller 16 increases the energy transfer rate between the primary energy source 12 and the load 18. In another instance, the controller 16 may decrease the rate of energy transfer between the primary energy source 12 and the load 18.

The determination in step 305 may be made based on a number of factors. For instance, the controller 16 may decide to enter the second operational mode at any time that the energy storage device 14 is engaged in energy transfer with the load 18. In another example, the controller 16 may only cause the hybrid energy system 10 to enter the second operational mode if the rate of energy transfer exceeds (or conversely does not exceed) at least one threshold value and/or falls within a set of values defining a range.

For instance, the energy storage device 14 may be providing energy to the load 18. The controller 16, after calculating an amount of energy that the energy storage device 14 is providing to the load 18, may determine that such amount of energy is negligible or is not sufficiently large to warrant switching to the second operational mode. Accordingly, the controller 16 may decide to remain in the first operational mode. In such a case, the controller 16 may perform a comparison of the amount of energy that the energy storage device 14 is providing to the load 18 to a lower threshold value, and if the amount of energy that the energy storage device 14 is providing to the load 18 does not exceed the threshold value, then the controller 16 may elect for the hybrid energy system 10 to remain in the first operational mode. Conversely, if the controller 16 determines that the amount of energy that the energy storage device 14 is providing to the load 18 as exceeding the threshold value, then the controller 16 may elect for the hybrid energy system 10 to enter the second operational mode.

In another example, the energy storage device 14 may be providing energy to the load 18, but the controller 16, after calculating the amount of energy that the energy storage device 14 is providing to the load 18, may decide not to enter the second operational mode if the amount of energy that the energy storage device 14 is providing to the load 18 exceeds an upper threshold value. As an example, there may be a physical tolerance level that would be exceeded if the hybrid energy system 10 were to enter the second operational mode. For instance, if the primary energy source 12 were an engine/generator being utilized to drive a rotating component propelling a traction device, the controller 16 may elect not to increase the energy that the primary energy source 12 is providing to the load 18 because by doing so, structural damage may occur to the hybrid energy system 10 and/or the load 18.

In one example, the upper threshold value and lower threshold value comprise a range. The determination in step 305 may involve defining the range, comparing the amount of energy that the energy storage device 14 is providing to the load 18, and entering into the second operational mode if the amount of energy falls within the range.

In step 307, the second operational mode is entered or not entered. If the second operational mode is not entered, then method returns to step 301. Otherwise, the method passes to step 309.

In step 309, the hybrid energy system 10 is operated in second operational mode. In the second operational mode, the controller 16 changes the rate of energy that the primary energy source 12 is providing to the load 18. In one example, the controller 16 causes the primary energy source 12 to increase the amount of energy that it is providing to the load 18. In another example, the controller 16 causes the primary energy source 12 to decrease the energy that it is providing to the load 18.

In step 311, the controller 16 evaluates whether or not to modify or end the second operational mode. For example, after increasing the rate of energy that the primary energy source 12 is providing to the load 18, the amount of energy provided by the energy storage device 14 will begin decreasing. In one example, the controller 16 may determine that the amount of energy that the energy storage device 14 is providing to the load 18 has decreased upon receipt of one or more signals from one or more of the primary energy source 12, the energy storage device 14, the load 18, and/or external sensors indicating that the energy storage device 14 is providing less energy to the load 18. In order to smooth operation of the hybrid energy system 10, the controller 16 may, determine to lessen gradually the rate at which the primary energy source 12 is providing energy to the load 18. If so, then in step 313, the controller 16 may modify the second operational mode. For instance, the controller 16 may elect to continue to have the primary energy source 12 provide more energy to the load 18 than in the first operational mode, but to a lesser degree than initially provided during the second operational mode. If the controller 16 selects this state, then the second operational mode is appropriately modified, in step 315, and then the method returns to step 309.

On the other hand, the hybrid energy system 10 may enter a state in which the energy needs of the load 18 may be handled exclusively by the primary energy source 12 and therefore energy transfer between the energy storage device 14 and the load 18 will stop. Accordingly, the controller 16, in step 311, may determine to end second operational mode. The method 300 then passes through step 313 and step 317 and the second operational mode is ended in step 319. The method 300 then passes to step 301 and the hybrid energy system 10 resumes operation in the first operational mode.

Figure 4:
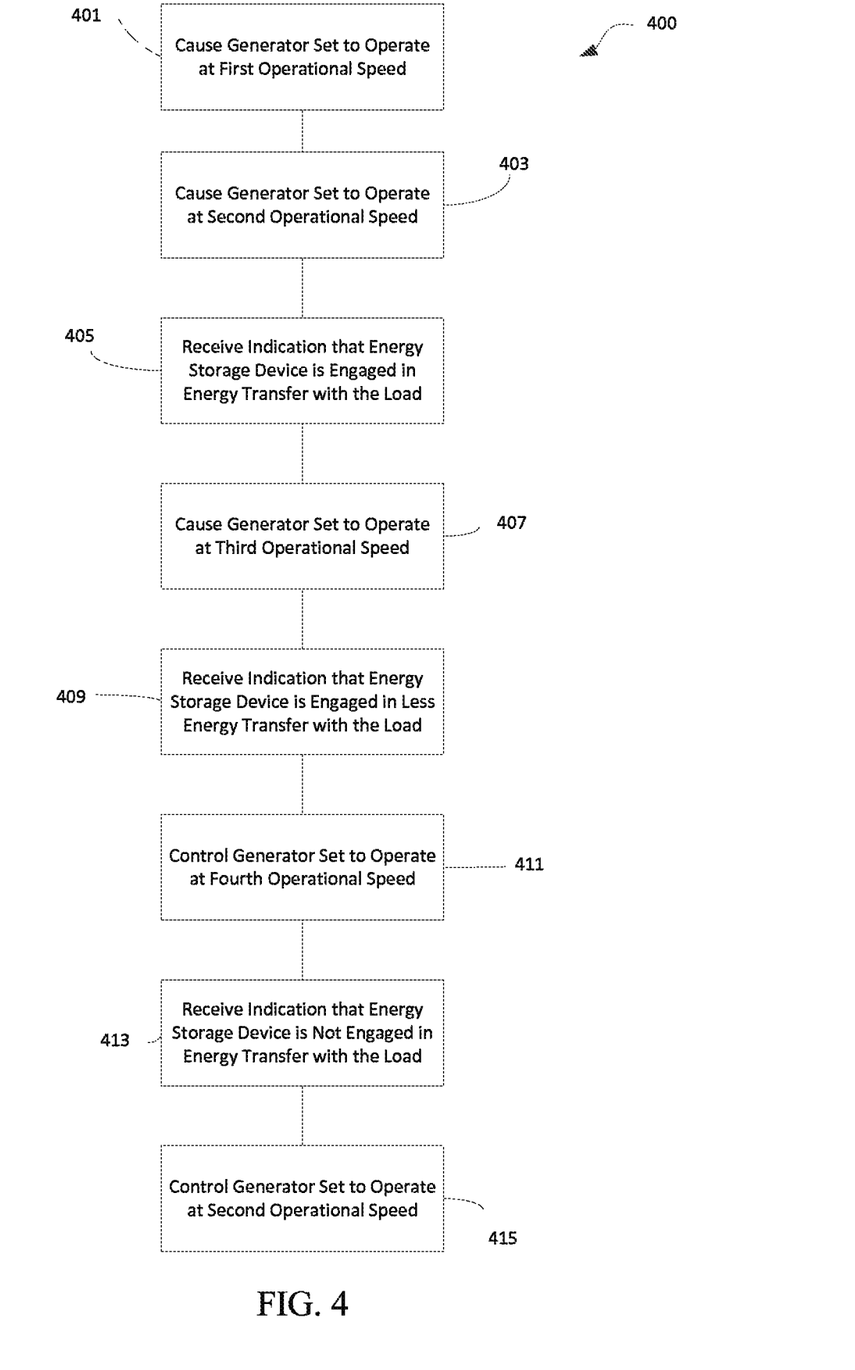
FIG. 4 is a schematic illustration of an exemplary control algorithm executable by the controller of FIG. 1.

Referring to FIGS. 2 and 4, an exemplary method 400 of operating the hybrid energy system 10 is provided for exemplary purposes. In the exemplary method 400, the primary energy source 12 may comprise one or more generator sets 13 utilized to drive the load 18 by rotating at an operational speed.

In step 401, the controller 16 may cause the one or more generator sets 13 to operate at a first operational speed. In step 403, due to a change in the demand of load 18, the controller 16 may adjust the one or more generator sets 13 to run at a second operational speed. For instance, the load 18 may increase due to operator of a device engaging in new operation, attaching additional equipment to a power supply or increasing the speed of an existing operation (e.g. increasing the speed of a vehicle). Alternatively, the load 18 may decrease due to an operator stopping an existing operation, removing equipment, or slowing the speed of an existing operation.

When such a change in the load occurs, the controller 16 may receive an indication to change (increase or decrease) the speed at which the one or more generator sets 13 are operating. The controller 16 may receive such an indication from a user of the system. In another example, the controller 16 may receive such an indication as an output of an algorithm based on the change of the load requirements as communicated to the controller 16 by sensors, which measure the current load demand of the hybrid energy system 10. That is, sensors within the hybrid energy system 10 may measure the load 18 and increase or decrease the speed of the one or more generator sets 13. In another example, the change in load requirements may be communicated to the controller 16 by the load 18 and/or one or more external devices.

In step 405, the controller 16 may cause the one or more generator sets 13 to operate at the second operational speed. In one example, the second operational speed may be greater than the first operational speed. For instance, the load requirement may increase and it may be desirable to increase the energy provided by the one or more generator sets 13 by increasing their speed. In another example, the load requirement may decrease and it may be desirable to decrease the speed at which the generator sets 13 operate. For example, it may be worthwhile to draw power from the load 18 to charge the energy storage device 14.

In step 407, the controller 16 may receive an indication that provides notice that the energy storage device 14 is engaged in energy transfer with the load 18. In one example, the energy storage device 14 may provide energy to the load 18 to supplement the energy provided by the one or more generator sets 13 such that the transient response time is minimized. However, in order to minimize the amount of time that the energy storage device 14 engages with the load 18, the controller 16, in step 407, may cause the one or more generator sets 13 to operate at a third operational speed. In one example, the third operational speed may be greater than the second operational speed. By increasing the speed of the one or more generator sets 13 beyond the required speed (e.g., the second operational speed) to drive the load 18, the output of one or more generator sets 13 is increased and therefore, the need for supplementation by the energy storage device 14 decreases and the time period during which the energy storage device 14 provide energy to the load 18 is reduced.

In step 409, the controller 16 may receive an indication that provides notice that the energy storage device 14 is engaged in less energy transfer with the load 18 than upon receipt of the indication in step 405. Accordingly, the controller 16, in step 411, may cause the one or more generator sets 13 to operate at a fourth operational speed. In one example, the fourth operational speed is less than the third operational speed, but greater than the second operational speed.

In step 413, the controller 16 may receive an indication that the one or more generator sets 13 are not engaged in energy transfer with the load 18. Accordingly, in step 415, the controller 16 may cause the one or more generator sets 13 to operate at the second operational speed.

Table 1 below provides exemplary data for an implementation of method of FIG. 4. It should be noted that the data values provided in Table 1 are used for illustrative purposes only and different data values could be used without departing from the principles of this disclosure. At time T(0), the one or more generator sets 13 are operating in a steady state. The Target Speed, the Actual Speed, and the Set Speed (the revolutions per minute ("RPM") at which the one or more generator sets 13 are set to operate) are each equal to X. At time T(1), the demand of the load 18 increases and, due to the transient response of the hybrid energy system 10, the Actual Speed decreases relative to the Target Speed to the value ½·X. At time T(2), the energy storage device 14 may be engaged to provide energy to the load 18 to minimize the transient response time for the one or more generator sets 13 to reach the Target Speed. Also at time T(2), due to the draw on the energy storage device 14 to drive the load 18, the controller 16 may increase the speed of the at one or more generator sets 13 to a multiple of the Target Speed, which in this example is 2X. At time T(3), the Actual Speed increases toward the Target Speed to a value of ¾X. Accordingly, the controller 16 decreases the Set Speed proportionally to 3/2X. It should be noted that, in the present example, the controller 16 decreases the Set Speed linearly and in proportion to the increase of the Actual Speed toward the Target Speed. However, the use of such a linear decrease in the Set Speed is for exemplary purposes only. In one embodiment, the controller 16 may elect to decrease the Set Speed in a non-linear manner. At time T(4), the Actual Speed returns to X, which is the Target Speed and the controller 16 sets the Set Speed of the one or more generator sets 13 to the value of the Target Speed, which is X.

TABLE 1

| Time | Actual Speed | Target Speed | Set Speed |
|------|--------------|--------------|-----------|
| T(0) | X            | X            | X         |
| T(1) | ½X           | X            | X         |
| T(2) | ½X           | X            | 2X        |
| T(3) | ¾X           | X            | 3/2X      |
| T(4) | X            | X            | X         |

Table 2 below provides another example of data for an implementation of the method 400 of FIG. 4. It should be noted that the data values provided in Table 2 are used for illustrative purposes only and different data values could be used without departing from the principles of this disclosure. At time T(0), the one or more generator sets 13 are operating in a steady state. The energy storage device 14 is not transferring energy to the load 18. Accordingly, the Target Speed, and the Set Speed are each equal to X. At time T(1), the demand of the load 18 increases and accordingly the energy storage device 14 begins to transfer energy in an amount equal to A to the load 18. At time T(2), due to the draw on the energy storage device 14 to drive the load 18, the controller 16 sets the Set Speed of the one or more generator sets 13 to C, wherein C is a value that is sufficiently greater than X such that the difference in speed between C and X provides energy to the load 18 that is equal to the draw A from the energy storage device 14 to compensate for the energy that the energy storage device 14 is providing to the load 18. At time T(3), the draw from the energy storage device 14 decreases to ¾A. Accordingly, the controller 16 decreases the Set Speed proportionally to 3/2C. It should be noted that, in the present example, the controller 16 decreases the Set Speed in a linearly and in proportion to the difference in the draw from energy storage device 14 between time T(3) and time T(2). However, the use of such a linear decrease is for exemplary purposes only. In one embodiment, the controller 16 may elect to decrease the Set Speed in a non-linear manner. At time T(4), the draw from the energy storage device 14 returns to 0 and the controller 16 causes the Set Speed of the one or more generator sets 13 to be equal to X, which is the value of the Target Speed.

TABLE 2

| Time | Draw from Energy Storage Device 14 | Target Speed | Set Speed |
|------|------------------------------------|--------------|-----------|
| T(0) | 0                                  | X            | X         |
| T(1) | A                                  | X            | X         |
| T(2) | A                                  | X            | C         |
| T(3) | ¾A                                 | X            | 3/2C      |
| T(4) | 0                                  | X            | X         |

It should be noted that in the case of a plurality of generator sets 13. The values in Table 2 can be adjusted such that each of the generator sets 13 compensates for a proportion of the total energy drawn from the energy storage device 14. Table 3 below provides exemplary data for a hybrid energy system 10 utilizing three of the generator sets 13 as the primary energy source 12. In Table 3, each of the generator sets 13 compensates for a ⅓ of the draw from the energy storage device 14. In the case of a hybrid energy system 10 with two generator sets 13, each of the generator sets 13 may compensate for ½ of the draw from the energy storage device 14. For a hybrid energy system 10 with four of the generator sets 13, each of the generator sets may compensate for ¼ of the draw from the energy storage device 14. It should be noted that the controller 16 may elect to not utilize each of the one or more generator sets 13 to compensate for the load 18 from the energy storage device 14. For instance, the controller 16 may elect to increase the set speed of a subset (e.g. one or more) of the one or more generator sets 13 to compensate for the draw from the energy storage device 14 while maintaining the others at a constant speed.

TABLE 3

| Time | Draw from Energy Storage Device 14 | Target Speed | Set Speed (1) | Set Speed (2) | Set Speed (3) |
|------|------------------------------------|--------------|---------------|---------------|---------------|
| T(0) | 0                                  | X            | X             | X             | X             |
| T(1) | A                                  | X            | X             | X             | X             |
| T(2) | A                                  | X            | ⅓C            | ⅓C            | ⅓C            |
| T(3) | ¾A                                 | X            | ½C            | ½C            | ½C            |
| T(4) | 0                                  | X            | X             | X             | X             |

It should be noted that the examples provided with reference to Tables 1-3 have been provided for illustrative purposes. The values shown in Tables 1-3 represent hybrid energy system 10 at discrete moments in time. The illustrative use of discrete values should not be construed as limiting controller 16 to discrete control of hybrid energy system 13. In one embodiment, the values shown for Set Speed may change discretely. In another embodiment, the values shown for Set Speed may change continuously. In one example, the controller 16 may have an output represented by Eq. 1 below:

$$y = k \cdot x \qquad \text{Eq. 1.}$$

In Eq. 1, y is the output from the controller 16 that is utilized to set the speed of the one or more generator sets 13; k is a tunable parameter and is a constant representing the value by which the controller 16 will increase or decrease the operational speed of the one or more generator sets 13; and x represents the magnitude of the energy transfer between the load 18 and the energy storage device 14.

INDUSTRIAL APPLICABILITY

Referring to FIGS. 1-4, the disclosed system and methods 300, 400 may be applicable to control any hybrid energy system. The disclosed system and methods 300, 400 may control energy output of a primary power source, e.g., the one or more generator sets 13, with respect to changing the load 18 to minimize the amount of energy required from the energy storage device 14 to achieve a desired transient response.

Referring to FIG. 1, the controller 16 may be operated to affect a desired manipulation of the energy storage device 14 when it is utilized to drive the load 18. When the energy storage device 14 is utilized to drive the load 18 in order to achieve a desired transient response, the controller 16 may increase the output of the primary energy source 12 beyond a predetermined target value. Referring to FIG. 2, the increase is accomplished, in one example, by increasing the set speed of the one or more generator sets 13. The increase in speed by the one or more generator sets 13 reduces the amount of time that the energy storage device 14 must supply energy to the load 18 to achieve a desired transient response. Accordingly, the total amount of energy that the energy storage device 14 must provide to the load 18 is reduced. Therefore, the capacity and therefore cost of the energy storage device 14 may be reduced, thereby reducing the manufacturing cost of the hybrid energy system 10.

In one example, the load 18 may be a traction load of a vehicle with respect to a surface and may change as a function of the current speed and/or acceleration of the vehicle, an operator demand to change the speed and/or acceleration, the grade of the surface, and/or other factors known in the art. Referring further to FIG. 2, as the load 18 transitions from rest to steady state operation, the energy required by the load 18 may decrease. For example, if the load 18 is a traction vehicle, the amount of energy required to accelerate a vehicle from rest to steady state speed may be substantially greater than the amount of energy required to maintain the vehicle at the steady state speed. However, as the load 18 subsequently changes, the energy required may correspondingly change. For example, an increase in the load 18, e.g., an operator demanded acceleration or an increase in surface grade, may require an increased amount of energy to be supplied from the one or more generator sets 13 and/or energy storage device 14. The one or more generator sets 13 may be controlled by the controller 16 to operate in a higher fuel consuming operating condition in order to minimize the energy required from the energy storage device 14 as the hybrid energy system 10 responds to increasing demand with a desired transient response.

Energy from energy storage device 14 may be selectively supplied to the load 18 and/or the one or more generator sets 13 to supplement the energy supplied therefrom and decrease the time required to respond to the increased load demands. The energy storage device 14 may receive energy from the one or more generator sets 13, may store the received energy, and may supply the stored energy to the one or more generator sets 13 and/or the load 18. The energy associated with the energy storage device 14, however, may be limited by the physical parameters, e.g., size of an accumulator, size of a battery, and/or other parameters. Methods 300, 400 may affect control of the one or more generator sets 13 and the energy storage device 14 to improve the timing of when energy may be directed from the one or more generator sets 13 to the energy storage device 14, the amount of energy stored within the energy storage device 14, and the operation of the one or more generator sets 13 to relatively more desirable operating conditions.

Referring to FIG. 4, the controller 16 may perform one or more of the steps associated with method 400 to affect control of the one or more generator sets 13 and the energy storage device 14. In step 401, the controller 16 may cause the one or more generator sets 13 to operate at a first operational speed. For example, the controller 16 may cause the one or more generator sets 13 to operate at a high speed-low torque operating condition to maintain a steady state operation of the load 18. The given high speed-low torque operating condition may not be the maximum output operating condition of the one or more generator sets 13.

In step 403, changes in the load 18 and/or operator demanded acceleration may require more energy than the one or more generator sets 13 may be capable of providing at the high speed-low torque operating condition. In such instances, the one or more generator sets 13 may experience a time delay when transitioning from the high speed-low torque to the high speed-high torque operating condition. The operator may consider this time delay undesirable, e.g., because of a decrease in the speed of the load 18 as the load 18 increases or because of a slow acceleration of the load 18 when the operator demands acceleration. Accordingly, energy stored within the energy storage device 14 may be selectively supplied to the one or more generator sets 13 and/or the load 18 to supplement the amount of energy produced by the one or more generator sets 13 to decrease the time delay of the one or more generator sets 13.

It may be desirable to control the amount of energy provided by the energy storage device 14 in order to minimize the capacity of the energy storage device 14 and thereby reduce manufacturing costs. In step 405, the controller 16 receives an indication that the energy storage device 14 is providing energy to the load 18. In step 407, the controller 16 may cause the one or more generator sets 13 to have having an increased energy output by increasing the operational speed of the one or more generator sets 13 beyond a target value. As such, the controller 16 may control the one or more generator sets 13 to an operating condition to produce an amount of energy greater than the amount required by the load 18 to minimize the amount of time necessary for the energy storage device 14 to provide energy to the load 18. In step 409, the controller 16 may receive an indication that an amount of energy provided by the energy storage device 14 has decreased relative to step 405. In step 411, the controller 16 may correspondingly reduce the amount of energy provided by the one or more generator sets 13 to the load 18 in order to smooth operation of the hybrid energy system 10. In step 413, the controller 16 may receive an indication that the energy storage device 14 is no longer providing power to the load 18, and in step 415, the controller 16 reduces the amount of energy provided by the one or more generator sets 13 to the amount necessary to operate in high-speed steady state operation.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A hybrid energy system, comprising:
   at least one generator set;
   at least one energy storage device; and
   a controller coupled to the at least one generator set and the at least one energy storage device, the controller being configured
      to cause the at least one generator set to operate at a first operational speed;
      to cause the at least one generator set to operate at a second operational speed in response to a change in a load;
      to receive a first indication comprising a notification that the at least one energy storage device is providing energy to the load and, in response to the first indication, to increase a first amount of energy that the at least one generator set is providing to the load by causing the at least one generator set to operate at a third operational speed;
to receive a second indication that a second amount of energy that the energy storage device is providing to the load is decreasing; and
to control the at least one generator set to decrease the first amount of energy that it is providing to the load in response to receiving the second indication.

2. The hybrid energy system of claim 1, wherein the controller is configured to control the at least one generator set to increase the first amount of energy that the at least one generator set is providing to the load by causing the third operational speed to be greater than the second operational speed.

3. The hybrid energy system of claim 2, wherein the controller is configured to receive the second indication comprising a notification that the at least one energy storage device is providing less energy to the load than upon receipt of the first indication.

4. The hybrid energy system of claim 3, wherein the controller is configured to control the at least one generator set to operate at the second operational speed in response to the second indication.

5. The hybrid energy system of claim 3, wherein the controller is configured to control the at least one generator set to operate at a fourth operational speed that is less than the third operational speed but greater than the second operational speed in response to the second indication.

6. The hybrid energy system of claim 1, wherein the at least one generator set comprises a plurality of generator sets.

7. The hybrid energy system of claim 6, wherein the controller is configured to adjust an operational speed of each of the plurality of generator sets in response to the first indication.

8. The hybrid energy system of claim 6, wherein the controller is configured to adjust an operational speed of a subset of the plurality of generator sets in response to the first indication.

9. A method of operating a hybrid energy system including at least one generator set and an energy storage device that are configured to provide energy to a load, the method comprising:
causing the at least one generator set to operate at a first operational speed;
causing the at least one generator set to operate at a second operational speed in response to a change in the load;
receiving a first indication comprising a notification that the energy storage device is engaged in energy transfer with the load;
causing the at least one generator set to operate at a third operational speed in response to the first indication;
receiving a second indication comprising a notification that the energy storage device is providing less energy to the load than upon receipt of the first indication; and
causing the at least one generator set to operate at a fourth operational speed that is greater than the second operational speed and less than the third operational speed in response to the second indication.

10. The method of claim 9, wherein the step of receiving the first indication comprises:
receiving a notification that the energy storage device is providing energy to the load.

11. The method of claim 10, wherein the fourth operational speed is less than the third operational speed in proportion to a difference between an amount of energy the energy storage device is providing to the load upon receipt of the first indication and an amount of energy that the energy storage device is providing to the load upon receipt of the notification that the energy storage device is providing less energy to the load than upon receipt of the first indication.

12. The method of claim 10, wherein the step of receiving the first indication comprises:
receiving a notification that the energy storage device is receiving energy from the load.

13. The method of claim 12, wherein the third operational speed is less than the second operational speed.

14. A method of controlling a hybrid energy system that is driving a load, the method comprising:
causing the hybrid energy system to operate in a first operational mode in which at least one generator set operates at a first operational speed;
causing the hybrid energy system to operate in a second operational mode in which the at least one generator set operates at a second operational speed in response to a change in the load;
determining whether or not to enter into a third operational mode of the hybrid energy system in response to receipt of an indication by comparing an amount of energy provided by an energy storage device to at least one threshold amount of energy;
receiving a first indication that there has been a change in energy transfer between the energy storage device and the load;
causing the hybrid energy system to operate in the third operational mode in which the at least one generator set operates at a third operational speed in response to the first indication;
receiving a second indication comprising a notification that the energy storage device is providing less energy to the load than upon receipt of the first indication; and
causing the hybrid energy system to operate in a fourth operational mode in which the at least one generator set operates at a fourth operational speed that is greater than the second operational speed and less than the third operational speed in response to the second indication.

15. The method of claim 14, wherein the step of receiving comprises:
receiving a notification that the energy storage device is providing energy to the load.

16. The method of claim 15, wherein the step of determining comprises:
calculating the amount of energy that the energy storage device is providing to the load;
comparing the amount of energy to the at least one threshold amount of energy;
causing the hybrid energy system to enter the third operational mode in response to the amount of energy exceeding the at least one threshold value.

17. The method of claim 16, wherein the at least one threshold value comprises a lower threshold value and an upper threshold value defining a range, and wherein the step of causing the system to enter the third operational mode comprises:
entering the third operational mode if the amount of energy is within the range.

18. The method of claim 17, further comprising:
receiving an indication that the amount of energy that the energy storage device is providing to the load is decreasing; and controlling the at least one generator set to decrease the amount of energy that it is providing to the load in response to receiving the indication that the amount of energy that the energy storage device is providing to the load is decreasing.

\* \* \* \* \*